3,351,610
CURABLE COMPOSITIONS CONTAINING A 1,2-EPOXY COMPOUND AND A DITERTIARY CYCLOALIPHATIC AMINE
Erich Preininger, Riehen, and Gustav Ott, Arlesheim, Switzerland, assignors to Ciba Limited, Basel, Switzerland, a company of Switzerland
No Drawing. Filed July 23, 1965, Ser. No. 474,508
Claims priority, application Switzerland, Aug. 31, 1964, 11,375/64
4 Claims. (Cl. 260—47)

It is known that epoxy resins can be cured with amines to form insoluble, cross-linked masses of high molecular weights. Preferred curing agents of this kind are diethylenetriamine, ethylenediamine and similar bifunctional or trifunctional primary amines. These amines react with the epoxy resin very rapidly, accompanied by a strong evolution of heat, and the resin+curing agent mixtures gel within minutes after having been prepared so that it is difficult to use them in actual practice, for example as casting resin or as paints and lacquers. Therefore, there have already been proposed for use as curing agents for epoxy resins tertiary amines that cause curing with evolution of les heat. Further advantages of tertiary amines is their longer pot life, less discoloration during curing at elevated temperatures, and the small amount of amine required to achieve complete curing of the epoxy resins, namely about 2 to 15%.

Mouldings cured with tertiary amines possess, however, in general poor mechanical properties, such as flexural strength, impact strength and shear strength, so that in the past tertiary amines by themselves have hardly been put to practical use. Nor do the ditertiary amines, for example 1,5-diperidylpentane, described in German Specification No. 1,032,920 by Werner Heidinger et al., patented Nov. 20, 1958, possess mechanical properties capable of satisfying stringent demands.

It has now been unexpectedly found that by using ditertiary alkylene-bis(cyclohexylamines) or mixtures thereof with co-catalysts not only the above-mentioned advantages of tertiary amines are ensured but mouldings are obtained that have excellent mechanical properties.

Accordingly, the present invention provides a process for curing epoxy compounds, having an epoxide equivalence greater than 1, with tertiary amines as curing agent, wherein the curing agent used is a ditertiary cycloaliphatic amine of the formula (I) 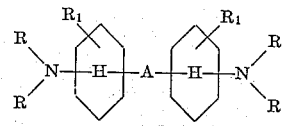

where A represents an alkylene radical containing 1 to 6 carbon atoms; R represents a lower alkyl radical, preferably a methyl group, and $R_1$ a hydrogen atom or a lower alkyl radical.

To the compounds of the Formula I used in the present invention belong, for example: 2,2-bis-(4-dimethylaminocyclohexyl)-propane, 1,2-bis-(4-dimethylaminocyclohexyl)-ethane, bis-(2-methyl-4-dimethylaminocyclohexyl)-methane, bis-(3-methyl-4-dimethylaminocyclohexyl)-methane, bis-(4-diethylaminocyclohexyl)-methane, 1,4-bis-(4-dibutylaminocyclohexyl)-butane, 4,4'-di-(dimethylamino)-3,3',5,5'-tetramethyldicyclohexylmethane and more specially bis-(4-dimethylaminocyclohexyl)-methane.

For curing the amines of the Formula I are used in the amounts usual tertiary amines, that is to say in amounts of about 2 to 15% by weight, referred to the epoxy resin to be cured.

According to a preferred variant of the present process the ditertiary amines of the Formula I are used in combination with other, known curing agents for epoxy resins, such as boronfluoride complexes, amines, acid anhydrides, phenols or the like, or monohydric or polyhydric alcohols. These known curing agents are added in amounts from 5 to 100 parts by weight for every 100 parts by weight of ditertiary amine (I). In view of this ratio these substances are definitely additives to the proper curing agent (I) of this invention so that we are here not concerned with the known use of tertiary amines as accelerators in the known curing of epoxy resins with anhydrides in which as a rule 0.01 to 2.5% by weight of tertiary amine (referred to the anhydride) is used.

The curing is usually carried out at a temperature ranging from 50 to 220° C., preferably from 80 to 180° C. According to a special variant of the process of this invention a precondensate is prepared at 50 to 130° C. by using a mixture of an amine of the Formula I with a boron trifluoride+amine complex in a proportion such that none of the two components by itself would suffice to bring about complete curing of the epoxy resin, the said precondensate being capable of complete curing at an elevated temperature, preferably within the range from 150 to 200° C. Such precondensates can be stored for over 1000 hours at room temperature, melt between 80 and 120° C. depending on the epoxy resin used and can be advantageously used in combination with fillers for the manufacture according to the whirl sintering process of elastic coatings having good stability towards chemicals. Metals cemented together with application of heat are distinguished by a high shear strength.

The afore-mentioned combination of a boron-trifluoride+amine complex with the ditertiary amines of the Formula I is suitable, for example, for the manufacture of cured mouldings or protective coatings having properties that could not be achieved with either of the two components used by itself. Above all, the flexibility of protective coatings can be raised to a multiple of what can be achieved with the tertiary amine or with the boron trifluoride+amine complex used singly. The two components are advantageously used at a ratio of, for example, 10 to 40 parts by weight of boron trifluoride+amine complex for every 100 parts by weight of the ditertiary amine.

Accordingly, the present invention further provides curable mixtures containing: (1) An epoxy compound having an epoxide equivalence greater than 1; and (2) A ditertiary amine of the Formula I as well as the curable precondensates obtained by performing the curing in two stages, the afore-mentioned curable mixtures being partially cured at 60 to 120° C.

The epoxy compounds having an epoxide equivalence greater than 1, which are present in the curable mixtures of this invention, contain—referred to the average molecular weight—$x$ epoxide groups, $x$ being a whole or fractional number greater than 1.

As is known, the usual methods for the manufacture of polyepoxy compounds produce in general commercial mixtures of compounds whose molecular weights differ from one another, and these mixtures further contain a share of compounds whose terminal epoxide groups have undergone partial hydrolysis. Therefore, the analytically determined value of the epoxide equivalence of such commercial mixtures need not necessarily be a whole number, namely at least 2, so long as it is higher than 1 in each case.

As epoxy compounds of the kind defined above there are suitable, for example: Alicyclic polyepoxides such as vinylcyclohexane dioxide, limonene dioxide, dicyclopentadiene dioxide, ethylene-glycol-bis-(3,4-epoxytetrahydro-dicyclopentadien-8-yl)ether, (3,4-epoxytetrahydro-dicyclopentadien-8-yl)glycidyl ether; epoxidized polybutadienes or copolymers of butadiene with ethylenically unsaturated compounds, such as styrene or vinyl acetate; compounds containing two epoxycyclohexyl radicals such as diethyleneglycol - bis(3,4 - epoxycyclohexane carboxylate), bis - 3,4(epoxycyclohexylmethyl) - succinate, 3,4-epoxy - 6 - methylcyclohexylmethyl - 3,4 - epoxy - 6-methylcyclohexane carboxylate and 3,4 - epoxyhexahydrobenzal-3,4-epoxycyclohexane-1,1-dimethanol.

Further suitable are polyglycidyl esters, such as are obtained by reacting a dicarboxylic acid with epichlorohydrin or dichlorohydrin in the presence of an alkali. Such polyesters may be derived from aliphatic dicarboxylic acids such as succinic or adipic acid, or preferably from aromatic dicarboxylic acids such as phthalic or terephthalic acid. As suitable examples there may be mentioned diglycidyl adipate and diglycidyl phthalate.

Preferred use is made of polyglycidyl ethers such as are obtained by etherifying a dihydric or polyhydric alcohol, or diphenol or polyphenol respectively, with epichlorohydrin or dichlorohydrin in the presence of an alkali. These compounds may be derived from glycols such as ethyleneglycol, diethyleneglycol, triethyleneglycol, 1,3-propyleneglycol, 1,4-butyleneglycol, 1,5-pentanediol, 1,6-hexanediol, 2,4,6-hexanetriol, glycerol and especially from diphenols or polyphenols such as resorcinol, pyrocatechol, hydroquinone, 1,4 - dihydroxynaphthalene, phenolformaldehyde condensation products of the resol or novolak type, bis - (para-hydroxyphenyl)-methane, bis-(para-hydroxyphenyl) - methylphenyl - methane, bis - (para - hydroxyphenyl) - tolylmethane, 4,4' - di - hydroxydiphenyl, bis-(para-hydroxyphenyl)-sulfone or especially from bis-(para-hydroxyphenyl)-dimethylmethane.

Particularly suitable epoxy resins are those which are liquid at room temperature, for example those from bis-(para-hydroxyphenyl)-dimethylmethane (Bisphenol A) having an epoxide content of 3.8 to 5.8 epoxide equivalents per kg. Such epoxy resins correspond e.g. to the average formula

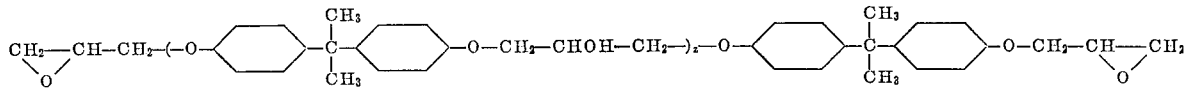

where z is a whole or fractional number from 0 to 2.

There may also be used mixtures of two or more of the epoxy resins mentioned above.

The curable mixtures of this invention may further contain suitable plasticizers such as dibutyl phthalate, dioctyl phthalate or tricresyl phosphate, or inert diluents so-called active diluents, especially monoepoxides e.g. butylglycide or cresylglycide.

As mentioned above, the curable mixtures of this invention may contain as additives or catalysts conventional curing agents for epoxy resins, for example: Amines, such as aliphatic or aromatic primary or secondary amines e.g.

mono or dibutylamine,
aniline,
N-methylaniline,
metaphenylenediamine,
bis(4-aminophenyl)methane,
bis(2-methyl-4-aminophenyl)methane,
bis(4-aminophenyl)sulfone,
diphenylamine,
para-chloraniline,
ethylenediamine,
N-hydroxyethyl-ethylenediamine,
N,N-diethyl-ethylenediamine,
tetra(hydroxyethyl)diethylenetriamine,
diethylenetriamine,
triethylenetetramine,
diethylamine,
piperidine,
piperazine, polymers of aminostyrenes, polybasic carboxylic acid anhydrides e.g.

phthalic anhydride,
methyl-endomethylene tetrahydrophthalic anhydride,
dodecenylsuccinic anhydride,
hexahydrophthalic anhydride,
hexachloro-endomethylene tetrahydrophthalic anhydride,
endomethylene-tetrahydrophthalic anhydride,
maleic anhydride,
succinic anhydride or pyromellitic dianhydride or mixtures of such anhydrides; mono- or polyhydric phenols e.g. phenol, ortho-, metha- or para-cresol, resorcinol, hydroquinone, 2,2-bis-(4'-hydroxyphenyl)-propane, or boron trifluoride or complexes thereof, especially its complexes with organic compounds e.g. boron trifluoride complexes with diethyl ether, anisole, monomethylamine, monoethylamine, dimethylamine or benzylamine. Further suitable co-catalysts are mono- or polyhydric alcohols such as butanol, ethyleneglycol, glycerol or mannitol; triarylphosphites such as triphenyl phosphite or tri(paratolyl) phosphite, and titanic acid esters such as tetrabutyl titanate. It is also possible to use a mixture of two or more of the afore-mentioned co-catalysts.

Furthermore, the curable mixtures of this invention may be admixed at any stage before being cured with fillers, pigments, dyestuffs, flame inhibitors, mould lubricants and the like. Suitable extenders and fillers are, for example, asphalt, bitumen, glass fibers, mica, quartz meal, cellulose, kaolin, ground dolomite, colloidal silica having a large specific surface (Aerosil) or metal powders, such as aluminum powder.

The curable mixtures may be used as they are or in the filled state, if desired in the form of solutions or emulsions, as laminating resins, fluidized bed sintering powders, paints, lacquers, dipping resins, casting resins, moulding compositions, coating compositions, putties, floorings, potting and insulating compounds for the electrical industry, adhesives or the like as well as for the manufacture of such products.

EXAMPLE 1

100 grams of Araldite GY 250 (registered trademark of Ciba Ltd. for an epoxy resin, prepared by condensing bisphenol A with epichlorohydrin in the presence of alkali, which is liquid at room temperature and contains 5.2 epoxide equivalents per kg.) were mixed with 5.0 g. of bis(4-dimethylamino-cyclohexyl)methane at room temperature; the mixture was left to itself for one hour at room temperature and then poured into moulds. Curing was carried out for 2 hours at 100° C. The cured castings displayed an impact strength (VSM) of over 24.9 cmkg./cm.².

EXAMPLE 2

100 grams of Araldite GY 250 (registered trademark) were mixed at room temperature with one of the tertiary amines shown in the Table 1 (see below) as curing agent and cured for 6 hours at 100° C., whereupon the impact strength of the castings was measured. Using another sample of the mixture its gelling time at 60° C. was determined in the "Tecam Gelation Timer" of Messrs. Techne (Cambridge) Ltd., Duxford, Cambridge, England (see N.A. de Bruyne, Modern Plastics, 27, No. 9, May 1960). Another 100 g. sample of the above mixture was poured into a tin can of 100 ml. capacity and the maximum temperature reached by exothermal reaction was measured.

The results obtained with the tertiary amines bis(4-dimethyl-aminocyclohexyl)methane (A), pentamethyldiethylenetriamine (B), N,N - dimethylaminocyclohexane (C) and 3-diethylaminopropylamine (D) are summarized in the following

TABLE 1

| Test No. | Curing agent [1] | Mol of amine-N per mol of epoxide | Gelation time at 60° C., minutes | Exothermal maximum temperature ° C. | Impact strength (VSM) cm.-kg./cm.[2] |
|---|---|---|---|---|---|
| 1 | 5 g. A | 0.07 | 74 | 65 | Over 24.7. |
| 2 | 2 g. B | 0.07 | 58 | 70 | 8.8. |
| 3 | 5 g. C | 0.07 | 41 | 96 | 7.9. |
| 4 | 10 g. A | 0.14 | | | Over 24.6. |
| 5 | 5 g. B | 0.17 | | | 15.8. |
| 6 | 5 g. D | 0.15 | 50 | | Brittle; cannot be measured. |

[1] Grams of curing agent per 100 g. of Araldite GY 250 (Reg. Trade mark).

EXAMPLE 3

30 grams of bis(4-dimethylaminocyclohexyl)methane and 20 g. of "Curing Agent 1040" (boron trifluoride-amine complex of Anchor Chem. Corp.) were stirred within 3 minutes at 100° C. into a mixture of 30 g. of diglycidyl ether of polypropyleneglycol of molecular weight 1025, 50 g. of titanium dioxide (rutile modification), 520 g. of Araldite 6071 [1], 550 g. of Araldite 6084 [2] and 50 g. of Aerosil [3], and the melt was cast in the form of a thin layer over a polyethylene foil. The resulting precondesate had after cooling a softening point according to Kofler of 95° C.

The brittle lumps of resin were crushed, ground in a rod mill and sifted to a particle size below 150µ.

This powder was used to cover degreased sheets of iron, which were preheated to 180° C, by the fluidized bed sintering process or with the aid of an electrostatic powder spraygun and the coating was then cured by being heated for 30 minutes at 180° C. The coating proved to be very flexible and resistant to impact. For a coating thickness of 200 to 300µ an Erichsen deep-draqing value (DIN 53 156) of over 9 mm. and an impact depression of over 85 cm./2 kg. in the coating was measured. The impact depression test was carried out with the Niesen impact depression tester described in the book by Dr. Felix Wilborn "physikalische und technische Prüfverfahren für Lacke und ihre Rohstoffe," 1953, vol. II, p. 642.

Furthermore, the powder was compressed in a layer thickness of about 1 mm. between two ground and degreased sheets of aluminum marketed under the trademark "Anticorodal B," measuring 170 x 25 x 1.5 mm., with an overlap of about 10 mm., by means of a clamp and cured by heating for 30 minutes at 150° C. The cemented bond thus obtained displayed a shear strength of 2.77 kg./mm.[2].

EXAMPLE 4

(a) 100 grams of Araldite GY 250[R] and 5 g. of bis(4-dimethyl-aminocyclohexyl)methane were mixed at room temperature.
(b) 100 grams of Araldite GY 250[R] and 10 of bis(4-dimethyl-aminocyclohexyl)methane were mixed at room temperature. Degreased and ground aluminum sheets, marketed under the trademark "Anticorodal B" (170 x 25 x 1.5 mm.), overlapping by 10 mm., were cemented with these mixtures. The bonds, achieved by curing for 30 minutes at 150° C., displayed shear strength values of (a) 2.35 and (b) 2.37 kg./mm.[2].

[1] Araldite 6071 is a registered trademark of Ciba Ltd. for an epoxy resin based on Bisphenol A and epichlorohydrin, having a softening point according to Kofler of 50° C. and containing 2.1 mols of epoxide groups per kg.
[2] Araldite 6084 is a registered trademark of Ciba Ltd. for an epoxy resin as under (1) but having a softening point according to Kofler of 75° C. and an epoxide content of 1.1 mols per kg.
[3] Aerosil is a registered trademark of Messrs. Degussa for a finely dispersed silica having a large inner surface.

EXAMPLE 5

A. Preparation of the curing agent 20.0 grams of bis(2-methyl-4-aminophenyl)methane were dissolved in 100.0 g. of bis (4-dimethylaminocyclohexyl)methane by stirring at 60° C.

B. Manufacturing the mouldings 7.5 grams of the curing agent, prepared as described under A, which is liquid at room temperature, were mixed at room temperature with 100 g. of the liquid epoxy resin mentioned in Example 1, and the mixture was poured into moulds and cured for 6 hours at 100° C. The bright, transparent castings displayed the following values:

Flexural strength (VSM), kg./mm.[2] _____ 12.3
Deflection (VSM), mm. _____ 12.8
Impact strength (VSM), cm.-kg./cm.[2] _____ over 25.2
Heat distortion point accdg. to Martens (DIN), ° C. __ 86

EXAMPLE 6

A. Preparation of the curing agent 10.0 grams of crystalline phenol were dissolved in 100.0 g. of bis(4-dimethylaminocyclohexyl)-methane by stirring at 60° C.

B. Manufacturing the mouldings 10.0 grams of the curing agent prepared according to A and 100.0 g. of the liquid epoxy resin mentioned in Example 1 were mixed at room temperature, then poured into moulds and cured for 6 hours at 100° C.

Flexural strength (VSM), kg./mm.[2] _____ 12.4
Deflection (VSM), mm. _____ 12.2
Impact strength (VSM), cm.-kg./cm.[2] _____ over 25.2
Heat distortion point accdg. to Martens (DIN), ° C. __ 72

EXAMPLE 7

A. Preparing the curing agent 20.0 grams of hexahydrophthalic anhydride were dissolved in 80.0 g. of bis(4-dimethylaminocyclohexyl)-methane by being heated with stirring to 60° C.

B. Manufacturing the mouldings 10.0 grams of the curing agent prepared according to A were dissolved at room temperature in 100.0 g. of the liquid epoxy resin mentioned in Example 1, cast in moulds and cured for 6 hours at 100° C.

Flexural strength (VSM), kg./mm.[2] _____ 12.5
Deflection (VSM), mm. _____ 12.9
Impact strength (VSM), cm.-kg./cm.[2] _____ over 25
Heat distortion point accdg. to Martens (DIN), ° C. __ 80

EXAMPLE 8

A. Preparing the curing agent

A homogeneous solution is prepared of 5.0 g. of 4,4'-di-hydroxydiphenylpropane (Bisphenol A), 2.0 g. of triphenylphosphite and 95.0 g. of bis(4-dimethylaminocyclohexyl)-methane with application of heat.

B. Manufacturing the mouldings 10.0 grams of the curing agent prepared according to A were dissolved at room temperature in 100.0 g. of the epoxy resin mentioned in Example 1, cast in moulds, then cured for 6 hours at 100° C.

Flexural strength (VSM), kg./mm.² _____ 12.7
Deflection (VSM), mm. _____ 12.6
Impact strength (VSM), cm.-kg./cm.² _____ over 24.5
Heat distortion point accdg. to Martens (DIN), ° C. __ 73

EXAMPLE 9

A. Preparing the curing agent 50.0 grams of bis(2-methyl-4-aminophenyl)methane were dissolved with stirring at 60° C. in 100.0 g. of bis(4-dimethylaminocyclohexyl)methane.

B. Manufacturing the mouldings 7.5 grams of the curing agent prepared according to A and 100.0 g. of the epoxy resin mentioned in Example 1 were mixed at room temperature; the mixture was left to itself for one hour, then poured into moulds and cured at different temperatures and for different times.

| Test No. | Cured for hours | At °C. | Deflection (VSM), mm. | Flexural strength (VSM), kg./mm.² | Impact strength (VSM), cm.-kg./cm.² | Heat distortion point accdg. to Martens (DIN) ° C. |
|---|---|---|---|---|---|---|
| 1 | 6 | 100 | 11.6 | 11.6 | over 25.2 | 86 |
| 2 | 3 | 120 | 13.8 | 11.9 | 24.7 | 79 |
| 3 | 12 | 120 | 12.0 | 11.1 | 25.2 | 79 |
| 4 | { 2 / 2 | 120 / 200 | 10.9 | 11.0 | 24.5 | 76 |

What is claimed is:

1. A curable composition of matter, comprising (1) a 1,2-epoxy compound having a 1,2-epoxide equivalency greater than 1, and (2) as curing agent a ditertiary cycloaliphatic amine of the formula

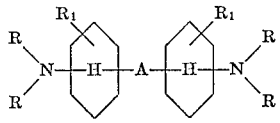

where A represents an alkylene radical containing 1 to 6 carbon atoms, R represents a lower alkyl radical with 1 to 4 carbon atoms and $R_1$ represents a member selected from the group consisting of hydrogen and lower alkyl radical with 1 to 4 carbon atoms.

2. A curable composition of matter, comprising (1) a 1,2-epoxy compound having a 1,2-epoxide equivalency greater than 1, and (2) as curing agent a ditertiary cycloaliphatic amine of the formula

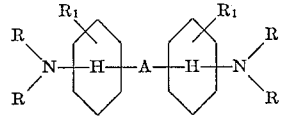

where A represents an alkylene radical containing 1 to 6 carbon atoms, R represents a lower alkyl radical with 1 to 4 carbon atoms and $R_1$ represents a member selected from the group consisting of hydrogen and lower alkyl radical with 1 to 4 carbon atoms, and (3) further curing agent a member selected from the group consisting of boron trifluoride-amine complexes, primary amines, secondary amines, polybasic carboxylic acid anhydrides, monohydric phenols, polyhydric phenols and triarylphosphites.

3. A curable precondensate which is obtained by heating a 1,2-epoxy compound having a 1,2-epoxide equivalency greater than 1 with a ditertiary cycloaliphatic amine of the formula

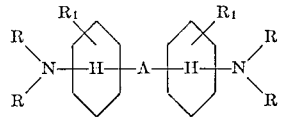

where A represents an alkylene radical containing 1 to 6 carbon atoms, R represents a lower alkyl radical with 1 to 4 carbon atoms and $R_1$ represents a member selected from the group consisting of lower alkyl radical with 1 to 4 carbon atoms at a temperature within the range from 60 to 120° C.

4. A curable precondensate which is obtained by heating a 1,2-epoxy compound having a 1,2-epoxide equivalency greater than 1 with a ditertiary cycloaliphatic amine of the formula

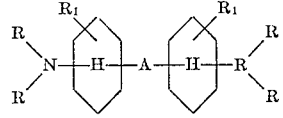

wherein A represents an alkylene radical containing 1 to 6 carbon atoms, R represents a lower alkyl radical with 1 to 4 carbon atoms and $R_1$ represents a member selected from the group consisting of hydrogen and lower alkyl radical with 1 to 4 carbon atoms and with a member selected from the group consisting of boron trifluoride-amine complexes, primary amines, secondary amines, polybasic carboxylic acid anhydrides, monohydric phenols, polyhydric phenols and triarylphosphites at a temperature within the range from 60 to 120° C.

No references cited.

WILLIAM H. SHORT, *Primary Examiner.*

T. D. KERWIN, *Assistant Examiner.*

UNITED STATES PATENT OFFICE
CERTIFICATE OF CORRECTION

Patent No. 3,351,610                                        November 7, 1967

Erich Preininger et al.

It is certified that error appears in the above identified patent and that said Letters Patent are hereby corrected as shown below:

Column 8, lines 41 to 46, the right-hand portion of the formula reading 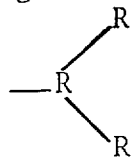 should read 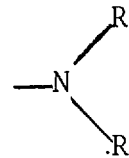

Signed and sealed this 20th day of January 1970.

(SEAL)
Attest:

Edward M. Fletcher, Jr.
Attesting Officer

WILLIAM E. SCHUYLER, JR.
Commissioner of Patents